United States Patent [19]
Palm

[11] Patent Number: 5,183,357
[45] Date of Patent: Feb. 2, 1993

[54] RIVET FASTENER WITH DRILLING BIT

[75] Inventor: Erich Palm, Heerbrugg, Switzerland

[73] Assignee: SFS Stadler Holding AG, Heerbrugg, Switzerland

[21] Appl. No.: 761,880

[22] PCT Filed: Dec. 21, 1990

[86] PCT No.: PCT/EP90/02291
§ 371 Date: Sep. 13, 1991
§ 102(e) Date: Sep. 13, 1991

[87] PCT Pub. No.: WO91/11628
PCT Pub. Date: Aug. 8, 1991

[30] Foreign Application Priority Data

Feb. 5, 1990 [DE] Fed. Rep. of Germany ....... 4003373

[51] Int. Cl.⁵ .................. F16B 13/04; F16B 13/06
[52] U.S. Cl. .......................................... 411/29; 42/43; 42/55
[58] Field of Search ............. 411/29, 30, 31, 42, 411/43, 55, 60

[56] References Cited

U.S. PATENT DOCUMENTS

| | | |
|---|---|---|
| 2,408,559 | 10/1946 | Keating . |
| 3,453,927 | 7/1969 | Moore . |
| 3,671,061 | 6/1972 | Dawdy ................ 411/30 |
| 3,851,560 | 12/1974 | Yago ................... 411/30 |
| 4,388,031 | 6/1983 | Rodgers ............... 411/43 |
| 4,560,312 | 12/1985 | Grady . |
| 4,920,833 | 5/1990 | Rosenthal ............. 411/29 |

FOREIGN PATENT DOCUMENTS

| | | |
|---|---|---|
| 0328314 | 8/1991 | European Pat. Off. . |
| 1775430 | 11/1971 | Fed. Rep. of Germany . |
| 3217065 | 11/1983 | Fed. Rep. of Germany . |
| 1243687 | 9/1960 | France . |
| 106954 | 12/1963 | Netherlands ............ 411/55 |
| 356640 | 10/1961 | Switzerland . |
| 360869 | 4/1962 | Switzerland . |

*Primary Examiner*—Neill R. Wilson
*Attorney, Agent, or Firm*—Helfgott & Karas

[57] ABSTRACT

A rivet fastener includes a threaded spindle having at a free end thereof a drill bit and an external casing having a stop flange and a sleeve portion with an internal thread corresponding to that of the spindle and receiving the spindle. The casing has a plurality of set-breaking grooves extending parallel to the axis of the casing. The threads and the drill bit are formed such that the threads run in a direction opposite to that of a drilling rotation.

20 Claims, 3 Drawing Sheets

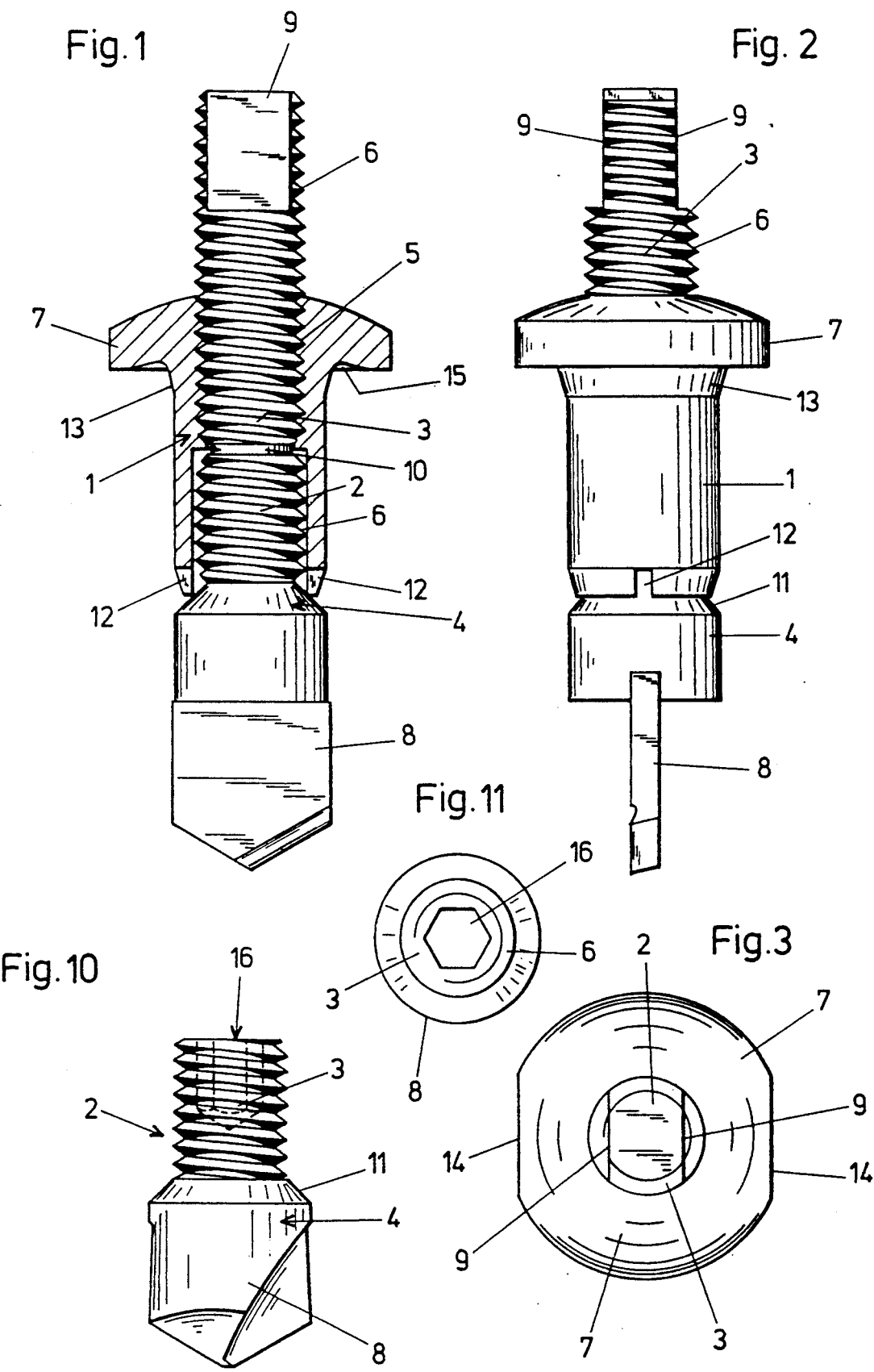

RIVET FASTENER WITH DRILLING BIT

BACKGROUND OF THE INVENTION

The present invention pertains to a rivet fastener connection assembly consisting of a rivet casing and a rivet spindle employable in the rivet casing. The spindle has a bolt-shaped shaft and, a larger head unit compared to the diameter of the shaft, and the head unit is formed or set onto said shaft. A drilling unit is formed or set onto the head unit, where the rivet casing and has an inner thread over at least a part of its length, and the shaft of the rivet spindle has an outer thread corresponding to the inner thread, over at least a part of its length, and wherein means are provided on the rivet casing and/or on a contact flange formed on the rivet casing, for form- and/or force-fitted mount of the rivet casing against the workpiece to be riveted, and/or against a setting tool for the rivet connector.

This type of a rivet connector is known from DE-OS 17 75 430 or from U.S. Pat. No. 3,453,927. This rivet connector does not generate a rivet connection by pulling the rivet spindle out in an axial direction after inserting the rivet connector into a drilled hole in the workpiece, in order to deform the rearward, free end of the rivet casing by this process, but rather, it concerns a means of effecting the riveting itself by turning the rivet spindle. In this case, the rivet casing has an inner thread and the rivet spindle has an outer thread corresponding to the inner thread, and the tensile force to deform the free end of the rivet casing is exerted on the head unit by twisting the rivet spindle in the rivet casing. In this case, very strong friction forces will be generated since a deformation of the free end of the rivet casing will occur. Thus in this known rivet connector the rivet spindle will often break (for example, at a set breakpoint), so that the setting process of the rivet connection cannot be terminated at all.

DE 32 17 065 A1 discloses a method to gap-open the free-end region of the rivet casing of pull-rivets, where the pull spindle is pulled out only in an axial direction. Due to the special formation of the head unit on the pull spindle, a tear-off of the free end of the rivet casing is effected by pyramid-shaped beveling, whereupon the pyramid edges notch in the rivet casing, so that the rivet casing tears open axially when tightening the head. This type of the connector can only be used on pure pull-spindles, since these tear-open edges on the pull spindle would prevent a twist motion of the pull spindle against the rivet housing. In addition, when meshing with the rivet casing, the edges would immediately cause such a large rise in the torque that the rivet casing would also turn or twist in a radial direction. An orderly setting process thus could not be implemented.

From DE-AS 14 75 216 a rivet connector is known where the rivet casing is equipped with an inner thread and the rivet spindle is provided in an outer thread, so that by turning motion of the rivet spindle, the riveting can be completed. In this known rivet connection there are problems however, inasmuch as the turning of the rivet casing during tightening of the rivet spindle cannot be prevented, so that not only could the workpiece be damaged, but also the rivet itself will not sufficiently ensure reliability.

From DE-OS 19 63 526 a self-drilling blind rivet is known that has a thickened section at the region adjoining the head unit of the shaft of the rivet spindle, whereby a thread is cut into this thickening. This thickened section with thread has a diameter that is much larger than that of the rivet spindle itself, and during the setting process, through rapid tightening of the rivet spindle with this threaded region, an expansion of the rivet casing will be effected. Since the advance of the pull part is much larger for this rivet spindle than the thread pitch on the rivet spindle, this threaded section on the rivet spindle will merely be contracted into the rivet casing, without requiring an opposing thread to be formed in the rivet casing. Thus only the inside diameter of the rivet casing will be expanded, so that it will press against the wall of the drilled hole in the workpiece.

Finally, DE 32 46 625 A1 and from DE 35 42 581 A1, rivet connectors without a drill section are known, where the rivet casing is not deformed during the setting procedure, but rather the diameter of an additional casing located over the rivet spindle is expanded by means of the rivet casing.

SUMMARY OF THE INVENTION

An object of the invention is to create a solid rivet connection unit with a rivet connection of the type described above, used without the necessity of a torque having a negative effect on setting process to be applied on the unit.

This and other objects of the invention are attained by a rivet connector which has a rivet casing with at least one predetermined breaking line running at least approximately parallel to the axis over a part of its length, beginning from the end turned away from the contact flange.

Since the rivet connector of this invention has a rivet spindle and also a head unit that turns opposite the fixed rivet casing during the setting process, the first axial force application to the free end of the rivet casing, due to the predetermined breaking lines, will split this region open so that the single-sector sections of the rivet casing will bend outward. Only when there is practically just the material of the thick, sector-like sections of the rivet casing still present between the underside of the workpiece and the head unit, will the torque for further twisting of the rivet spindle increase, so that at the final stage of the setting process, a sudden increase in torque will occur, leading to an optimum conclusion of the setting process.

In the rivet connector according to this invention, when tightening the rivet spindle, the free end of the rivet casing tears open at the locations defined by the predetermined breaking lines, so that single tabs separate from each other and are pressed outward. This will cause not only a very good rivet connection, but also the force application to generate this rivet connection is also reduced considerably. This is an important advantage over the known rivet connection unit in which the rivet casing is merely deformed axially or has its diameter expanded.

The type and manner of forming the predetermined breaking lines in the rivet casing has a particularly favorable effect on the subsequent setting, or the rivet connection. It is particularly useful that the predetermined breaking lines of the rivet casing be formed as notches, grooves or slits running parallel to the axis. This will create not only a simple separation of the single sections at the perimeter region of the rivet casing, but it will also ensure that practically star-shaped perimeter sections of equal size will always be bent outward. It is an advantage if the predetermined breaking lines are formed in the form of notches or grooves at the inner and/or at the outer wall of the rivet casing. The notches or grooves are of triangular, polygonal, trapezoidal or circular cross section. It is expedient to provide at least three sequential predetermined breaking lines distributed uniformly along the perimeter of the rivet casing.

Another possibility for satisfactory tear-open of the end region of the rivet casing during the setting process resides in the fact that at the free end of the rivet casing, radial slits, notches or grooves can be formed that run all the way through and are open toward the end of the rivet casing. Thus set-break notches are created practically at the free end of the rivet casing, so that an orderly tear-open can occur, perhaps with no additional predetermined breaking lines running in an axial direction.

In this regard it is also possible that the notches or grooves of the predetermined breaking lines pass into slits, notches or grooves running radially at the free end of the rivet casing. This is then a combination of predetermined breaking lines running in an axial direction, with the radial slits, notches or grooves running all the way through.

For an optimal deformation of the rivet casing and a simpler in and out pressing of the free end of the rivet casing, it is an advantage if a blunt cone-shaped transition portion is provided between the shaft and the head unit of the rivet spindle.

Preferred embodiments of the invention will be described in greater detail below, with reference to the figures.

BRIEF DESCRIPTION OF THE DRAWINGS

FIG. 1 is a side sectional view of a rivet connector

FIG. 2 is a side view of the rivet connector;

FIG. 3 is a top view of the rivet connector;

FIG. 10 is a side view of the rivet spindle of the rivet connection according to FIG. 4; and FIG. 11 is a top view of the rivet spindle according to FIG. 10;

DETAILED DESCRIPTION OF PREFERRED EMBODIMENTS

Figure 4:
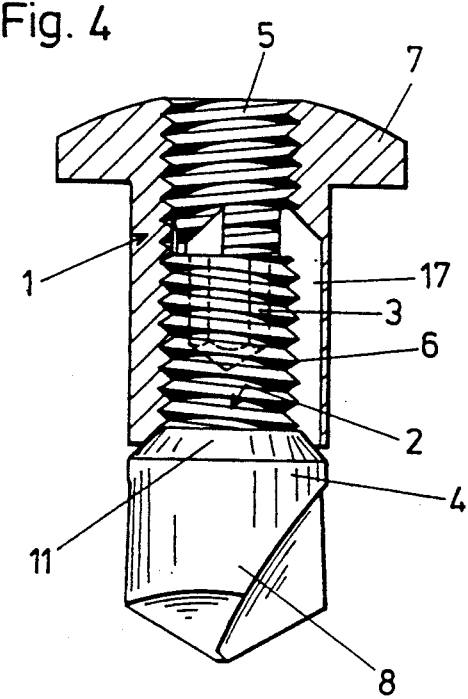
FIG. 4 is a side sectional view of another embodiment

The rivet connector consists essentially of a rivet casing (1) and a rivet spindle (2). The rivet spindle (2) is composed of a bolt-shaped shaft (3) and a head unit (4) of a larger diameter than that of the shaft and located or shaped on this shaft. The rivet casing (1) is provided with an inner thread (5) which is produced before or during the setting process. Shaft (3) of the rivet spindle (2) is provided with a corresponding outer thread (6). One or several protruding ribs, expansions, grooves, roughenings, slits, flattenings or similar features for form- and/or force-fitted mounting of rivet casing (1) formed on the contact flange (7) formed on the rivet casing (1) are provided opposite the workpiece to be riveted and/or opposite a setting tool for the rivet connector.

The rivet connector can be introduced into a prepared opening in a workpiece and then set. In the illustrated embodiments, a drill or bit piece (8) is provided or formed on the head unit (4). In the embodiments of for FIGS. 1-3, piece 8 is a plate-shaped cut-piece and in the embodiment of FIGS. 4, 5 and 10, it is a drill piece of a circular cross section.

The direction of the hole drilling and the rotation direction when tightening the rivet spindle (2) are the same, and the inner thread (5) at the rivet casing (1) and the outer thread (6) on shaft (3) run opposite the direction of turning when drilling the hole, so that for a drill rotation directed in a clockwise direction, a left thread on shaft (3) and on rivet casing (1) will be used.

In the embodiment of FIGS. 1-3, the inner thread (5) of the rivet casing (1) runs only along a partial region of its length, but the, lower free end of the rivet casing (1) forms a cylindrical casing on the inside. Shaft (3) of rivet spindle (2) is provided along its entire length with an outer thread (6). On the free-end region of rivet spindle (2), an inner or outer drive unit is provided for insertion or application of a tool. In the embodiment shown in FIGS. 1-3, at the free end of the rivet spindle (2) there are bevels (9) located at diametrically opposing regions. In this design, the rivet spindle (2) is longer than the rivet casing (1) and in the region of shaft (3) located within the rivet casing (1), a set-break point (10) is provided.

Between shaft (3) and head unit (4) of the rivet spindle (2) there is a blunt cone-shaped transition section (11) which simplifies the setting process, that is, the pull-in of the head unit (4) into the rivet casing (1).

At the free end of the rivet casing (1), there are radial slits (12) extending all the way through and open on the end of the casing. Due to these slits (12), when the head unit (4) of the rivet spindle (2) is inserted, the free-end region of the rivet casing (1) will tear open. This then will create set-break notches.

In the embodiment according to FIGS. 1-3 there is a conical expansion (13) enlarged toward the contact flange located at the transition between the rivet casing (1) and the contact flange (7) at the outer surface of rivet casing (1). This expansion allows a force-fit mount of the rivet casing (1) in the drilled hole of the workpiece. After drilling through the workpiece and a corresponding, forced insertion of the rivet casing (1) into the drilled hole, for example, by a hammer impact, a fixed seat of the rivet casing (1) is ensured with respect to the workpiece. In this design, the potential is created that the rivet casing (1) can be secured against twisting during the setting process using a setting tool or an appropriate hand tool. With this design, two diametrically opposing bevels (14) can be provided as tool application surfaces on the contact flange (7). The contact flange (7) of the rivet casing (1) could also be equipped with a unit like a screw head, with tool application surface and/or slits.

With this embodiment it would also be possible to employ an additional seal and also an O-ring for additional twist-lock, since a circumferential ring groove (15) is formed on the underside of the contact flange (7). At the underside of contact flange (7), a friction-enhancing washer could also be used, e.g., a rubber washer. If it is merely important to secure the rivet casing (1) against twisting, then a toothed disk could also be used at the underside of the contact flange (7).

In the embodiment according to FIGS. 4–11, the rivet casing (1) is provided along its entire length with an inner thread (5). Shaft (3) of the rivet spindle (2) is shorter than the length of rivet casing (1) and on its free end it has an internal drive unit (16). In this embodiment, the pull-spindle (2) does not extend over the surface of the rivet casing (1), not even after final setting of the rivet connection, so that no set-break points are required here. Thus no parts will be lost and no parts will drop off.

Figure 9:
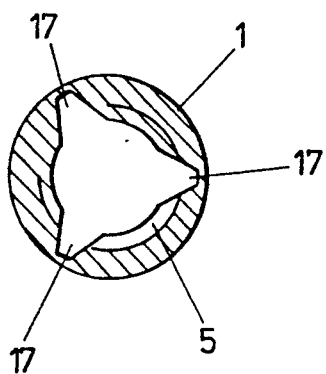
FIG. 9 is a cross section view through the rivet casing in the region of the predetermined breaking lines.
Figure 12:
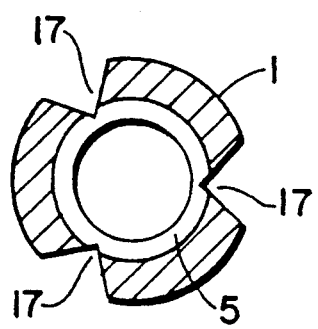
FIG. 12 is a cross-sectional view through the rivet casing having predetermined breaking grooves in the outer wall thereof.
Figure 13:
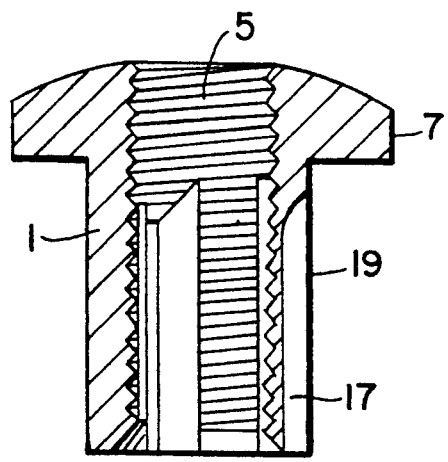
FIG. 13 is a cross-sectional elevation view of the rivet casing of FIG. 12 with the rivet spindle inserted therein.
Figure 14:
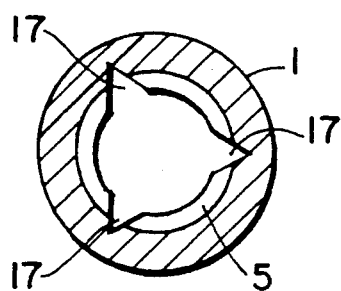
FIG. 14 is a cross-sectional view similar to that of FIG. 9 but with the casing having triangular grooves.
Figure 15:
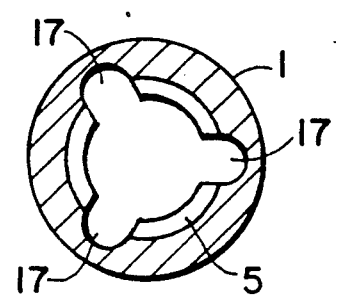
FIG. 15 is a cross-sectional view similar to that of FIG. 14 but with circular grooves.
Figure 16:
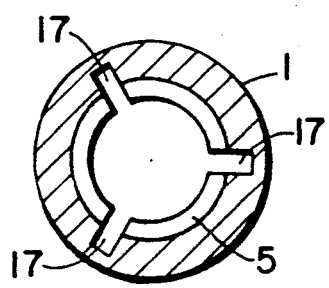
FIG. 16 is a cross-sectional view similar to that of FIG. 15 but with the grooves formed as slits.

In this embodiment the rivet casing (1) has predetermined breaking lines (17) running at least approximately parallel to the axis along a part of its length, beginning from the end turned away from the contact flange (7). These predetermined breaking lines (17) are formed by notches or grooves at the inside wall of rivet casing (1), but could also be designed in the form of radial slits running all the way through as shown in FIGS. 12 and 13. But it would also be possible to form these predetermined breaking lines (17) at the outer wall of rivet casing (1), or alternately at the inside and outside wall. The cross-sectional shape of the predetermined breaking lines (17) can be selected differently. It is therefore possible to form the notches or grooves in a triangular, polygonal, trapezoidal, or circular cross section. Trapezoidal-shaped grooves are shown in FIG. 9, triangular-shaped grooves are shown in FIG. 14 and the grooves of a circular cross-section are shown in FIG. 15. FIG. 16 shows the grooves of slit shape. At any rate, it is an advantage if at least three sequential predetermined breaking lines (17) are distributed uniformly around the perimeter of casing (1). According to FIG. 5, the circumferential sections of the rivet casing (1) will be pressed apart in a star-shape by the predetermined breaking lines (17), so that an optimum locking of the rivet casing (1) will occur at the back side of a workpiece (18) being riveted.

Figure 5:
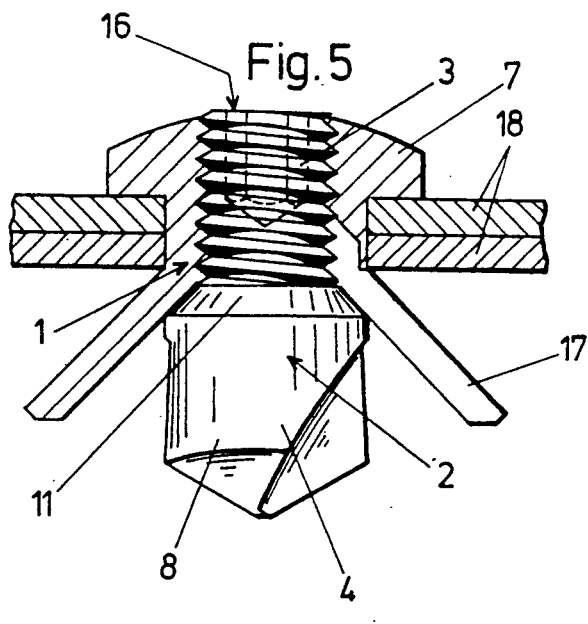
FIG. 5 is a side sectional view of the rivet connector after completion of the setting process on one workpiece.
Figure 6:
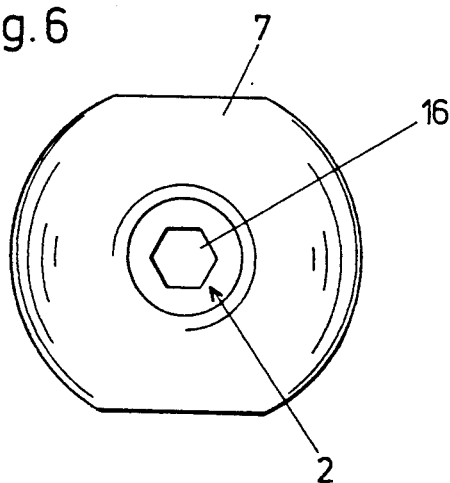
FIG. 6 is a top view of the rivet connector according to FIG. 4.
Figure 8:
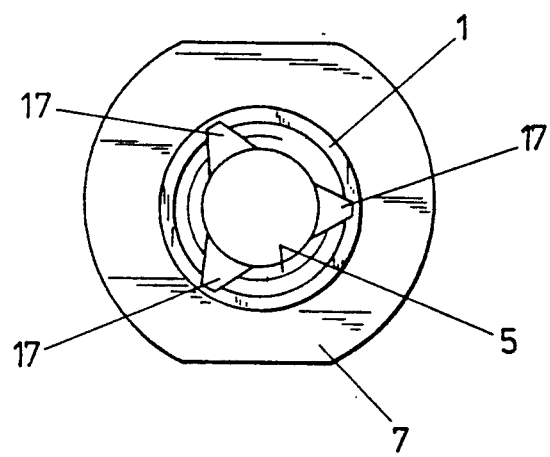
FIG. 8 is a top view of the rivet casing.

In this regard it would also be possible to combine the embodiment according to FIG. 1 and FIG. 4 so that then the notches or grooves of the predetermined breaking lines (17) will pass into radial slits (12) running all the way through at the free end of the rivet casing (1). Then the tear-off of the rivet casing (1) would also be improved in the region of the predetermined breaking lines (17).

For setting a rivet connector according to the above description, it will first be inserted onto the workpiece (18), and the drilling bit (8) will produce the drilled hole in workpiece (18). Due to the special formation of the thread, the rivet spindle (2) can be pulled into the rivet casing (1) upon additional turning of the rivet spindle in the same direction of rotation used in the drilling process, so that subsequently an orderly riveting is achieved.

In the description and in the figures, self-drilled rivet connectors are illustrated and explained. But rivet connectors can also be used that are inserted into predrilled holes on workpiece (18). Then merely the drilling unit (8) of the rivet spindle (2) will be eliminated.

To secure the rivet casing (1) against turning with respect to workpiece (18) or with respect to a setting tool, various design configurations are possible. It would be possible for example, to install one or more radially protruding ribs or hubs aligned parallel with the axis underneath the contact flange (7) on the rivet casing (1). Another sample embodiment is to form the contact flange (7) of the rivet casing (1) as a recessed head with a multi-cornered cross section. It would also be possible for the outer region of the rivet casing (1) to have a knurling, ridging or roughening at least in the region directly adjoining the contact flange (7), in order thereby to achieve a force- and/or form-fitted mount of rivet casing (1) in the drilled hole of workpiece (18). Another variant would be to provide a gearing with radially running teeth or ribs at the underside of the contact flange (7).

Figure 7:
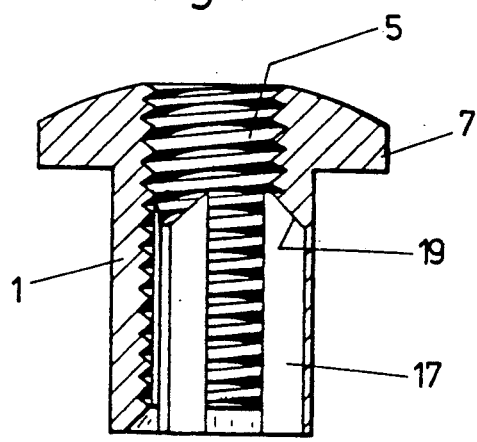
FIG. 7 is a cross section view through a rivet casing according to FIG. 4.

The predetermined breaking lines (17) in the embodiments shown in FIGS. 4 and 7 run along about two-thirds of the length of the rivet casing (1) proceeding from their free end-region. This length is variable, depending on the purpose of the rivet casing (1) or the rivet connection.

In the described embodiments the rivet casing (1) comes into direct contact with the head unit (4) of the rivet spindle (2). A design would be possible where a casing is inserted between the free end of the rivet casing (1) and the head unit (4) of the rivet spindle (2) and this casing is deformable when tightening the rivet connection. A casing made of rubber, plastic or aluminum could be used in the connector of the invention.

A material is selected for the rivet spindle (2) and the rivet casing (1) which is an optimal material for the particular end use. So it is possible to produce the rivet casing (1) of metal or even out of plastic. One such version would be of particular interest if the rivet casing (1) were to have an insulating function.

What is claimed is:

1. A self-drilling rivet fastener, comprising a rivet casing and a rivet spindle inserted into said rivet casing, said rivet casing having an internal thread extending over at least a part of a length thereof and including a sleeve portion and a stop flange of a larger diameter, said rivet spindle including a bolt-shaped shaft having an external thread over at least a part of a length thereof and corresponding to said internal thread and adapted for threading thereinto and a head unit terminating with a drill bit for producing a hole in a workpiece for receiving the fastener, said internal and external threads being formed such that rotation of said rivet spindle to produce a hole in the workpiece will cause said rivet spindle to thread into said sleeve portion to set the rivet, said flange having shaped surface means on a face thereof facing the workpiece to provide a fitting mount of said rivet casing against the workpiece, said rivet casing being formed with predetermined breaking grooves extending parallel to an axis of the casing over a part of the length thereof starting at said stop flange.

2. The fastener according to claim 1, wherein said grooves are slit-shaped.

3. The fastener according to claim 1, wherein said grooves are formed in an inner wall of said casing.

4. The fastener according to claim 1, wherein said grooves are of trapezoidal cross-section.

5. The fastener according to claim 1, wherein said grooves are of triangular cross-section.

6. The fastener according to claim 1, wherein said grooves are of circular cross-section.

7. The fastener according to claim 1, wherein said grooves are formed in an outer wall of said casing.

8. The fastener according to claim 1, wherein at least three of said grooves are formed.

9. The fastener according to claim 1, wherein said casing has a free end which is formed with radial slits open to said end of said casing.

10. The fastener according to claim 9, wherein said grooves merge into said radial slits.

11. The fastener according to claim 1, wherein said spindle includes a frustoconical transition portion between said shaft and said head unit.

12. A self drilling rivet fastener, comprising a rivet casing and a rivet spindle inserted into said rivet casing, said rivet casing having an internal thread extending over at least a part of a length thereof and including a sleeve portion and a stop flange of a larger diameter, said rivet spindle including a bolt-shaped shaft having an external thread over at least a part of a length thereof and corresponding to said internal thread and adapted for threading thereinto and a head unit terminating with a drill bit for producing a hole in a workpiece for receiving the fastener, said internal and external threads being formed such that rotation of said rivet spindle to produce a hole in the workpiece will cause said rivet spindle to thread into said sleeve portion to set the rivet, said flange having shaped surface means on a face thereof facing the workpiece to provide a fitting mount of said rivet casing against the workpiece, said rivet casing being formed with predetermined breaking grooves extending parallel to an axis of the casing over a part of the length thereof starting at said stop flange, said rivet casing further including radially extending slits at a free end thereof, said grooves merging into said radially extending slits.

13. The fastener according to claim 12, wherein said grooves are slit-shaped.

14. The fastener according to claim 12, wherein said grooves are formed in an inner wall of said casing.

15. The fastener according to claim 12, wherein said grooves are of trapezoidal cross-section.

16. The fastener according to claim 12, wherein said grooves are of triangular cross-section.

17. The fastener according to claim 12, wherein said grooves are of circular cross-section.

18. The fastener according to claim 12, wherein said grooves are formed in an outer wall of said casing.

19. The fastener according to claim 12, wherein at least three of said grooves are formed.

20. The fastener according to claim 12, wherein said spindle includes a frustoconical transition portion between said shaft and said head unit.

* * * * *